(12) United States Patent
Zhu et al.

(10) Patent No.: US 9,268,122 B2
(45) Date of Patent: Feb. 23, 2016

(54) OFF-AXIAL THREE-MIRROR OPTICAL SYSTEM WITH FREEFORM SURFACES

(71) Applicants: Tsinghua University, Beijing (CN); HON HAI PRECISION INDUSTRY CO., LTD., New Taipei (TW)

(72) Inventors: Jun Zhu, Beijing (CN); Tong Yang, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/571,965

(22) Filed: Dec. 16, 2014

(65) Prior Publication Data

US 2015/0253552 A1    Sep. 10, 2015

(30) Foreign Application Priority Data

Mar. 5, 2014   (CN) .......................... 2014 1 0077774

(51) Int. Cl.
  *G02B 5/10*    (2006.01)
  *G02B 17/06*   (2006.01)
  *G01J 1/04*    (2006.01)

(52) U.S. Cl.
  CPC ........... *G02B 17/0626* (2013.01); *G01J 1/0414* (2013.01); *G02B 17/0642* (2013.01)

(58) Field of Classification Search
  CPC .......... G02B 17/0626; G02B 17/0642; G02B 17/0621; H01L 27/14825
  USPC .................... 359/850–851, 856–859; 250/216
  See application file for complete search history.

(56) References Cited

U.S. PATENT DOCUMENTS

| 2008/0123205 | A1* | 5/2008  | Nakano   | ............ | G02B 17/0626 |
|              |     |         |          |              | 359/859      |
| 2010/0271691 | A1* | 10/2010 | Sakagami | .......... | G02B 17/0642 |
|              |     |         |          |              | 359/351      |

* cited by examiner

*Primary Examiner* — James Phan
(74) *Attorney, Agent, or Firm* — Novak Druce Connolly Bove + Quigg LLP

(57) ABSTRACT

An off-axial three-mirror optical system with freeform surfaces includes a primary mirror, a secondary mirror, a tertiary mirror, and an image sensor. The primary mirror is located on an incident light path. The secondary mirror is located on a primary mirror reflecting light path. The tertiary mirror is located on a secondary mirror reflecting light path. The image sensor is located on a tertiary mirror reflecting light path. The primary mirror, the secondary mirror, and the tertiary mirror are all xy polynomial surfaces up to the sixth order. The off-axial three-mirror optical system with freeform surfaces can achieve push-broom image with small F-number and large field angles.

18 Claims, 4 Drawing Sheets

OFF-AXIAL THREE-MIRROR OPTICAL SYSTEM WITH FREEFORM SURFACES

CROSS-REFERENCE TO RELATED APPLICATIONS

This application claims all benefits accruing under 35 U.S.C. §119 from China Patent Application No. 201410077774.4, filed on Mar. 5, 2014 in the China Intellectual Property Office, disclosure of which is incorporated herein by reference. The application is also related to copending applications entitled, "DESIGN METHOD OF FREEFORM SURFACE APPLIED TO OPTICAL SYSTEMS", filed on Feb. 6, 2015, with application Ser. No. 14/616,457; "OFF-AXIAL THREE-MIRROR OPTICAL SYSTEM WITH FREEFORM SURFACES", filed on Dec. 16, 2014, with application Ser. No. 14/571,952; "DESIGN METHOD OF OFF-AXIAL THREE-MIRROR OPTICAL SYSTEM WITH FREEFORM SURFACES", filed on Feb. 6, 2015, with application Ser. No. 14/616,463.

BACKGROUND

1. Technical Field

The present disclosure relates to an off-axial three-mirror optical system with freeform surfaces, and particularly to an off-axial three-mirror optical system with freeform surfaces which can achieve push-broom image with small F-number and large field angles.

2. Description of Related Art

Compared with conventional rotationally symmetric surfaces, freeform surfaces have asymmetric surfaces and more degrees of design freedom, which can reduce the aberrations and simplify the structure of the reflective scanning system. Thus, freeform surfaces are often used in off-axial three-mirror optical system.

However, conventional off-axial three-mirror optical systems with freeform surfaces are mainly applied to linear field of view with small field angles and large F-number, but the applications in the field of view with large field angles and small F-number are limited.

What is needed, therefore, is to provide an off-axial three-mirror optical system with freeform surfaces, which can achieve large field angles and small F-number.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the freeform surface reflective scanning system.

DETAILED DESCRIPTION

The disclosure is illustrated by way of example and not by way of limitation in the figures of the accompanying drawings in which like references indicate similar elements. It should be noted that references to "one" embodiment in this disclosure are not necessarily to the same embodiment, and such references mean at least one.

Figure 1:
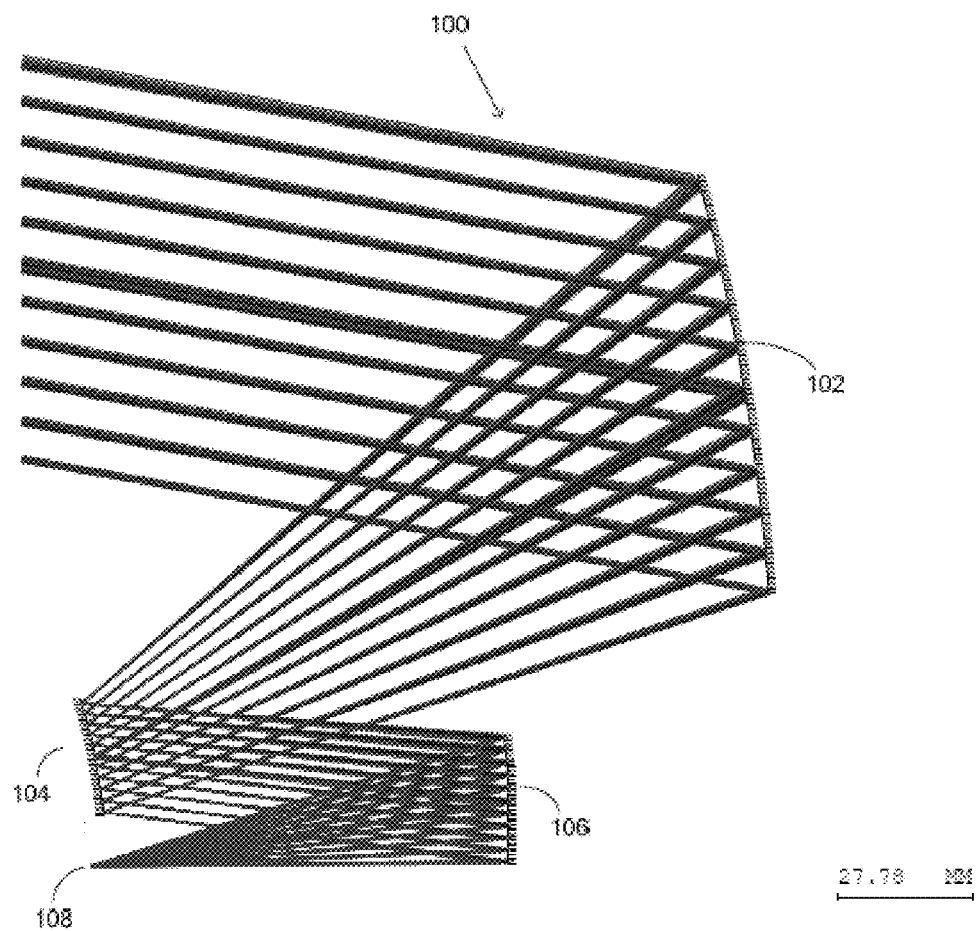
FIG. 1 is a schematic view of an off-axial three-mirror optical system with freeform surfaces light path according to one embodiment.
Figure 2:
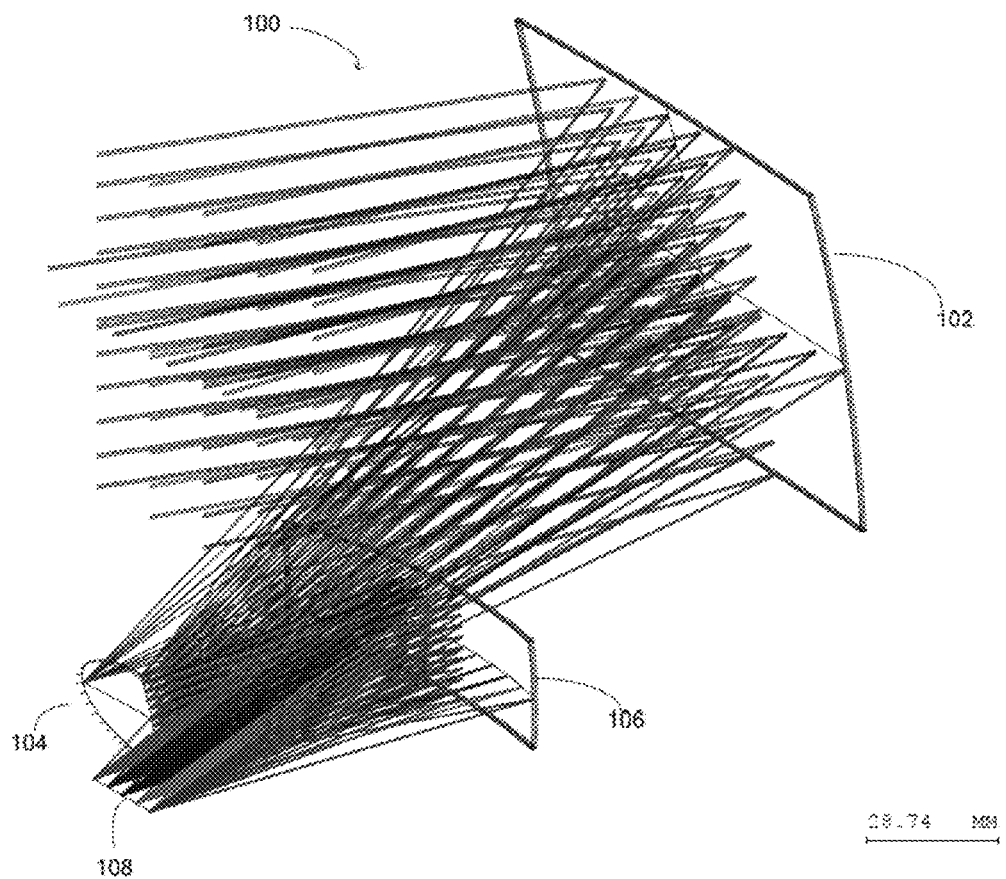
FIG. 2 is a schematic view of an off-axial three-mirror optical system with freeform surfaces three-dimensional configuration according to one embodiment.
Figure 3:
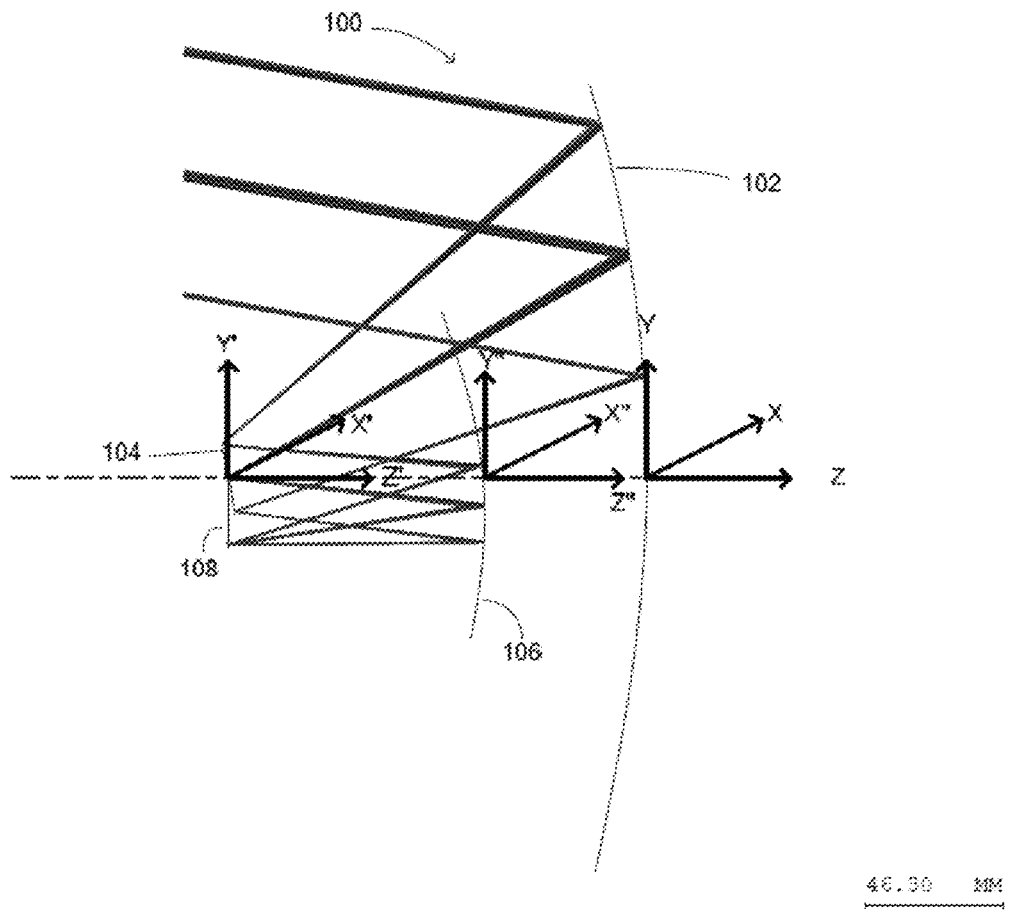
FIG. 3 is a schematic view of an off-axial three-mirror optical system with freeform surfaces configuration according to one embodiment.

Referring to FIGS. 1-3, an off-axial three-mirror optical system with freeform surfaces 100 of one embodiment is provided. The off-axial three-mirror optical system with freeform surfaces 100 includes a primary mirror 102, a secondary mirror 104, a tertiary mirror 106, and an image sensor 108. The primary mirror 102 is located on an incident light path; the secondary mirror 104 is located on a primary mirror reflected light path; the tertiary mirror 106 is located on a secondary mirror reflected light path; and the image sensor 108 is located on a tertiary mirror reflected light path. A primary mirror reflecting surface, a secondary mirror reflecting surface, and a tertiary mirror reflecting surface are all freeform surfaces; and the secondary mirror is a stop surface.

An off-axial three-mirror optical system with freeform surfaces light path of one embodiment can be depicted as follows. Firstly, an incident light reaches the primary mirror 102, and is reflected by the primary mirror 102 to form a first reflected light $R_1$. Secondly, the first reflected light $R_1$ reaches the secondary mirror 104, and is reflected by the secondary mirror 104 to form a second reflected light $R_2$. Thirdly, the second reflected light $R_2$ reaches the tertiary mirror 106, and is reflected by the tertiary mirror 106 to form a third reflected light $R_3$. Finally, the third reflected light $R_3$ is received by the image sensor 108.

A first three-dimensional rectangular coordinates system (X,Y,Z) is defined by a primary mirror location; a second three-dimensional rectangular coordinates system (X',Y',Z') is defined by a secondary mirror location; and a third three-dimensional rectangular coordinates system (X'',Y'',Z'') is defined by a tertiary mirror location.

A primary mirror vertex is a first three-dimensional rectangular coordinates system (X,Y,Z) origin. A horizontal line passing through the primary mirror vertex is defined as a Z-axis, in the Z-axis, to the left is negative, and to the right is positive. A Y-axis is in a plane shown in FIG. 1, in the Y-axis, in a direction substantially perpendicular to the Z-axis, to the upward is positive, and to the downward is negative. An X-axis is perpendicular to a YZ plane, in the X-axis, in a direction substantially perpendicular to the YZ plane, to the inside is positive, and to the outside is negative.

In the first three-dimensional rectangular coordinates system (X,Y,Z), a primary mirror surface is an xy polynomial surface. An xy polynomial surface equation can be expressed as follows:

$$z(x, y) = \frac{c(x^2 + y^2)}{1 + \sqrt{1 - (1 + k)c^2(x^2 + y^2)}} + \sum_{i=1}^{N} A_i x^m y^n.$$

In the equation, z represents surface sag, c represents surface curvature, k represents conic constant, while $A_i$ represents the ith term coefficient. Since the off-axial three-mirror optical system with freeform surfaces 100 is symmetrical about a YOZ plane, so even-order terms of x can be only remained. At the same time, higher order terms will increase the fabrication difficulty of the off-axial three-mirror optical system with freeform surfaces 100. In one embodiment, the primary mirror surface is an xy polynomial surface up to the sixth order without odd items of x. A sixth order xy polynomial surface equation can be expressed as follows:

$$z(x, y) = \frac{c(x^2 + y^2)}{1 + \sqrt{1 - (1+k)c^2(x^2 + y^2)}} + A_2 y + A_3 x^2 + A_5 y^2 + A_7 x^2 y +$$
$$A_9 y^3 + A_{10} x^4 + A_{12} x^2 y^2 + A_{14} y^4 + A_{16} x^4 y + A_{18} x^2 y^3 + A_{20} y^5.$$
$$+ A_{21} y^6 + A_{23} x^4 y^2 + A_{25} x^2 y^4 + A_{27} y^6.$$

In one embodiment, the values of c, k, and $A_i$ in the sixth order xy polynomial surface equation are listed in TABLE 1. However, the values of c, k, and $A_i$ in the sixth order xy polynomial surface equation are not limited to TABLE 1.

TABLE 1

| | |
|---|---|
| c | −0.001259078 |
| k | −7.45441151 |
| $A_2$ | 0.007340832 |
| $A_3$ | 0.00011016 |
| $A_5$ | −0.000509972 |
| $A_7$ | 5.5789531E−07 |
| $A_9$ | −6.1761984E−07 |
| $A_{10}$ | −2.7607128E−10 |
| $A_{12}$ | −3.8446170E−09 |
| $A_{14}$ | 2.6788063E−09 |
| $A_{16}$ | −4.7744225E−12 |
| $A_{18}$ | 4.8865466E−12 |
| $A_{20}$ | −1.2584172E−11 |
| $A_{21}$ | −1.1562329E−14 |
| $A_{23}$ | 2.1268750E−14 |
| $A_{25}$ | −4.3909505E−16 |
| $A_{27}$ | 3.6354825E−14 |

The second three-dimensional rectangular coordinates system (X',Y',Z') is obtained by moving the first three-dimensional rectangular coordinates system (X,Y,Z) for about 139.873 mm along a Z-axis negative direction; and a secondary mirror vertex is a second three-dimensional rectangular coordinates system (X,Y,Z) origin. In other words, a distance between the first three-dimensional rectangular coordinates system (X,Y,Z) origin and the second three-dimensional rectangular coordinates system (X',Y',Z') origin is about 336.649 mm.

In the second three-dimensional rectangular coordinates system (X',Y',Z'), a secondary mirror surface is an x'y' polynomial surface. An x'y' polynomial surface equation can be expressed as follows:

$$z'(x', y') = \frac{c'(x'^2 + y'^2)}{1 + \sqrt{1 - (1+k')c'^2(x'^2 + y'^2)}} + \sum_{i=1}^{N} A_i' x'^m y'^n.$$

In the equation, z' represents surface sag, c' represents surface curvature, k' represents conic constant, while $A_i'$ represents the ith term coefficient. Since the off-axial three-mirror optical system with freeform surfaces 100 is symmetrical about Y'Z' plane, so even-order terms of x' can be only remained. At the same time, higher order terms will increase the fabrication difficulty of the off-axial three-mirror optical system with freeform surfaces 100. In one embodiment, the secondary mirror surface is an x'y' polynomial surface up to the sixth order without odd items of x'. A sixth order x'y' polynomial surface equation can be expressed as follows:

$$z'(x', y') = \frac{c'(x'^2 + y'^2)}{1 + \sqrt{1 - (1+k')c'^2(x'^2 + y'^2)}} + A_2' y' + A_3' x'^2 + A_5' y'^2 +$$
$$A_7' x'^2 y' + A_9' y'^3 + A_{10}' x'^4 + A_{12}' x'^2 y'^2 + A_{14}' y'^4 + A_{16}' x'^4 y' +$$
$$A_{18}' x'^2 y'^3 + A_{20}' y'^5 + A_{21}' y'^6 + A_{23}' x'^4 y'^2 + A_{25}' x'^2 y'^4 + A_{27}' y'^6.$$

In one embodiment, the values of c', k', and $A_i'$ in the sixth order x'y' polynomial surface equation are listed in TABLE 2. However, the values of c', k', and $A_i'$ in the sixth order x'y' polynomial surface equation are not limited to TABLE 2.

TABLE 2

| | |
|---|---|
| c' | 0.003876139 |
| k' | −0.34802184 |
| $A_2'$ | −0.199697292 |
| $A_3'$ | −0.003296752 |
| $A_5'$ | −0.006989087 |
| $A_7'$ | −1.9538487E−06 |
| $A_9'$ | −2.8779308E−05 |
| $A_{10}'$ | −9.4487860E−08 |
| $A_{12}'$ | −2.4621298E−07 |
| $A_{14}'$ | 2.7636424E−07 |
| $A_{16}'$ | −7.4539496E−10 |
| $A_{18}'$ | −2.7376614E−09 |
| $A_{20}'$ | 1.1386414E−08 |
| $A_{21}'$ | −9.1533262E−12 |
| $A_{23}'$ | −3.4125882E−11 |
| $A_{25}'$ | 4.5002836E−12 |
| $A_{27}'$ | 2.5113825E−10 |

The third three-dimensional rectangular coordinates system (X",Y",Z") is obtained by moving the second three-dimensional rectangular coordinates system (X',Y',Z') for about 84.992 mm along a Z'-axis positive direction; and a tertiary mirror vertex is a third three-dimensional rectangular coordinates system (X",Y",Z") origin. In other words, a distance between the second three-dimensional rectangular coordinates system (X',Y',Z') origin and the third three-dimensional rectangular coordinates system (X,Y,Z) origin is about 84.992 mm.

In the third three-dimensional rectangular coordinates system (X",Y",Z"), a tertiary mirror surface is an x"y" polynomial surface. An x"y" polynomial surface equation can be expressed as follows:

$$z''(x'', y'') = \frac{c''(x''^2 + y''^2)}{1 + \sqrt{1 - (1+k'')c''^2(x''^2 + y''^2)}} + \sum_{i=1}^{N} A_i'' x''^m y''^n.$$

In the equation, z" represents surface sag, c" represents surface curvature, k" represents conic constant, while $A_i''$ represents the ith term coefficient. Since the off-axial three-mirror optical system with freeform surfaces 100 is symmetrical about Y"Z" plane, so even-order terms of x" can be only remained. At the same time, higher order terms will increase the fabrication difficulty of the off-axial three-mirror optical system with freeform surfaces 100. In one embodiment, the tertiary mirror surface is an x"y" polynomial surface up to the sixth order without odd items of x". A sixth order x"y" polynomial surface equation can be expressed as follows:

$$z''(x'', y'') = \frac{c''(x''^2 + y''^2)}{1 + \sqrt{1 - (1 + k'')c''^2(x''^2 + y''^2)}} + A_2''y'' + A_3''x''^2 + A_5''y''^2 +$$
$$A_7''x''^2y' + A_9''y''^3 + A_{10}''x''^4 + A_{12}''x''^2y''^2 + A_{14}''y''^4 + A_{16}''x''^4y'' +$$
$$A_{18}''x''^2y''^3 + A_{20}''y''^5 + A_{21}''y''^6 + A_{23}''x''^4y''^2 + A_{25}''x''^2y''^4 + A_{27}''y''^6.$$

In one embodiment, the values of $c''$, $k''$, and $A_i''$ in the sixth order $x''y''$ polynomial surface equation are listed in TABLE 3. However, the values of $c''$, $k''$, and $A_i''$ in the sixth order $x''y''$ polynomial surface equation are not limited to TABLE 3.

TABLE 3

| | |
|---|---|
| $c''$ | 0.002586059 |
| $k''$ | −19.29884842 |
| $A_2''$ | −0.084234843 |
| $A_3''$ | −0.004737493 |
| $A_5''$ | −0.004749666 |
| $A_7''$ | −1.2831834E−06 |
| $A_9''$ | −3.4279386E−06 |
| $A_{10}''$ | −1.9965925E−08 |
| $A_{12}''$ | −2.8581720E−08 |
| $A_{14}''$ | 1.5682997E−07 |
| $A_{16}''$ | −3.1135397E−11 |
| $A_{18}''$ | −2.3756684E−10 |
| $A_{20}''$ | 1.1136538E−09 |
| $A_{21}''$ | −4.3993354E−12 |
| $A_{23}''$ | −1.0892720E−11 |
| $A_{25}''$ | −5.9049331E−12 |
| $A_{27}''$ | 1.0527961E−11 |

The materials of the primary mirror 102, the secondary mirror 104 and the tertiary mirror 106 can be aluminum, beryllium or other metals. The materials of the primary mirror 102, the secondary mirror 104 and the tertiary mirror 106 can also be silicon carbide, quartz or other inorganic materials. A reflection enhancing coating can also be coated on the metals or inorganic materials to enhance the reflectivity performance of the three mirrors. In one embodiment, the reflection enhancing coating is a gold film.

The image sensor 108 can be a charge-coupled device (CCD) type or a complementary metal-oxide semiconductor (CMOS) type. In one embodiment, a planar array CCD is employed as the image sensor 108. The image sensor 108 is substantially parallel to a Y"X" plane, and a distance between the image sensor 108 and the Y"X" plane is about 85.414 mm.

An off-axial three-mirror optical system with freeform surfaces effective entrance pupil diameter is about 72 mm.

All the primary mirror 102, the secondary mirror 104 and the tertiary mirror 106 themselves have no rotation angle, however, all the primary mirror 102, the secondary mirror 104 and the tertiary mirror 106 adopt an off-axis field of view in a Y-axis direction. An off-axial three-mirror optical system with freeform surfaces field angle is about 24°×0.07°, wherein an angle along an X-axis direction is in a range from about −12° to about 12°, and an angle along the Y-axis direction is in a range from about −9.965° to about −10.035°.

An off-axial three-mirror optical system with freeform surfaces wavelength is not limited, in one embodiment, the off-axial three-mirror optical system with freeform surfaces wavelength is in a range from about 350 nm to about 770 nm.

An off-axial three-mirror optical system with freeform surfaces effective focal length (EFL) is about 94.09 mm.

An off-axial three-mirror optical system with freeform surfaces relative aperture (D/f) is about 0.769; and an off-axial three-mirror optical system with freeform surfaces F-number is a relative aperture (D/f) reciprocal, the F-number is about 1.3.

Figure 4:
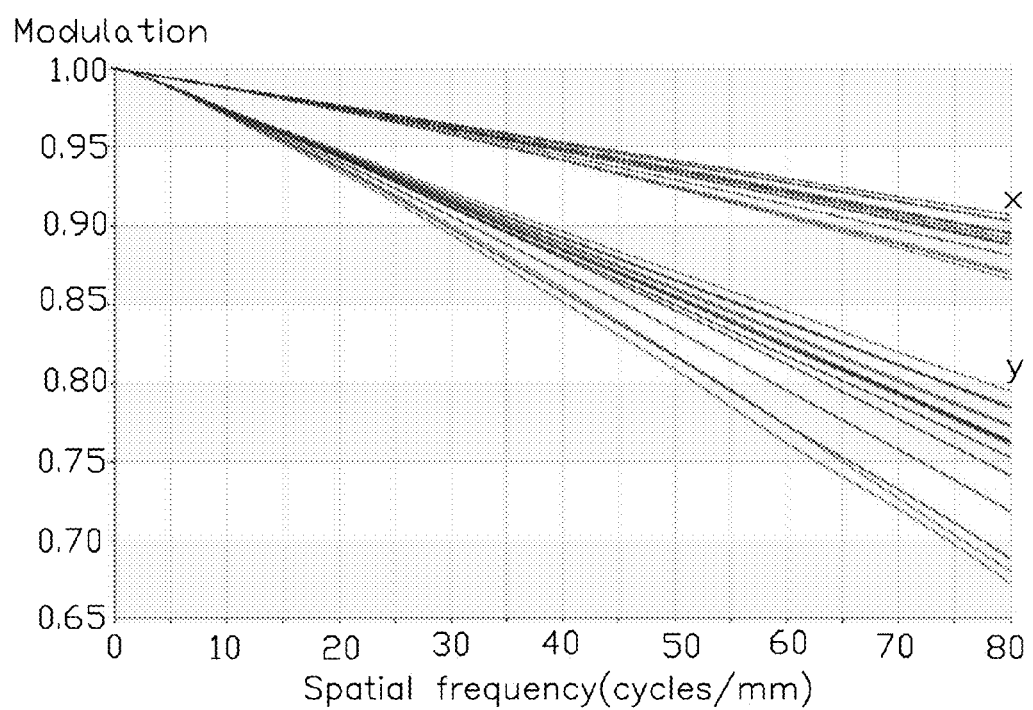
FIG. 4 is a graph showing modulation transfer function curves in visible band of partial field angles of an off-axial three-mirror optical system with freeform surfaces according to one embodiment.

Referring to FIG. 4, off-axial three-mirror optical system with freeform surfaces modulation transfer functions (MTF) in visible band of partial field angles are higher than 0.65. It shows that an off-axial three-mirror optical system with freeform surfaces imaging quality is high.

Compared with a coaxial three-mirror optical system, the off-axial three-mirror optical system with freeform surfaces 100 can have many advantages.

The off-axial three-mirror optical system with freeform surfaces 100 has larger field angle, thereby enabling the off-axial three-mirror optical system with freeform surfaces 100 has larger field of view, and larger imaging range.

The primary mirror surface, the secondary mirror surface and the tertiary mirror surface are all freeform surfaces, compared with spherical or aspherical system, the off-axial three-mirror optical system with freeform surfaces 100 has more variables that can be controlled, which is conducive to correct aberrations, and obtain better imaging quality.

The off-axial three-mirror optical system with freeform surfaces 100 has smaller F-number and larger relative aperture, which allows more lights to enter the off-axial three-mirror optical system with freeform surfaces 100, and enables the off-axial three-mirror optical system with freeform surfaces 100 has higher input energy and limiting resolution.

The polynomial surface order of the freeform surface mirrors in the off-axial three-mirror optical system with freeform surfaces 100 are low, which makes the off-axial three-mirror optical system with freeform surfaces 100 are easier to be assembled and fabricated.

The above-described contents are detailed illustrations with specific and preferred embodiments for the present disclosure. It cannot be considered that the implementation of the present disclosure is limited to these illustrations. For one of ordinary skill in the art, variations and equivalents having the same effects and applications can be made without departing from the spirit of the present disclosure and should be seen as being belonged to the scope of the present disclosure.

What is claimed is:

1. An off-axial three-mirror optical system with freeform surfaces comprising:
   a primary mirror located on an incident light path, and configured to reflect an incident light to form a first reflected light; and a first three-dimensional rectangular coordinates system (X,Y,Z) is defined by a primary mirror vertex as a first origin;
   a secondary mirror located on a first reflected light path, and configured to reflect the first reflected light to form a second reflected light; a secondary mirror reflecting surface is a stop surface; and a second three-dimensional rectangular coordinates system (X',Y',Z') is defined by a secondary mirror vertex as a second origin; and the second three-dimensional rectangular coordinates system (X',Y',Z') is obtained by moving the first three-dimensional rectangular coordinates system (X,Y,Z) along a Z-axis negative direction;
   a tertiary mirror located on a second reflected light path, and configured to reflect the second reflected light to form a third reflected light; a third three-dimensional rectangular coordinates system (X",Y",Z") is defined by a tertiary mirror vertex as a third origin; and the third three-dimensional rectangular coordinates system (X",Y",Z") is obtained by moving the second three-dimensional rectangular coordinates system (X',Y',Z') along a Z'-axis positive direction; and
   an image sensor is located on a third reflected light path and configured to receive the third reflected light;

wherein a primary mirror surface is an xy polynomial surface up to the sixth order; a secondary mirror surface is an x'y' polynomial surface up to the sixth order; and a tertiary mirror surface is an x"y" polynomial surface up to the sixth order.

2. The system as claimed in claim 1, wherein an xy polynomial surface equation is $$z(x, y) = \frac{c(x^2 + y^2)}{1 + \sqrt{1 - (1+k)c^2(x^2 + y^2)}} + A_2 y + A_3 x^2 + A_5 y^2 + A_7 x^2 y + A_9 y^3 + A_{10} x^4 + A_{12} x^2 y^2 + A_{14} y^4 + A_{16} x^4 y + A_{18} x^2 y^3 + A_{20} y^5 + A_{21} y^6 + A_{23} x^4 y^2 + A_{25} x^2 y^4 + A_{27} y^6.$$

wherein, c represents surface curvature, k represents conic constant, and $A_2 \sim A_{27}$ represent coefficients.

3. The system as claimed in claim 2, wherein c=−0.001259078, k=−7.45441151, $A_2$=0.007340832, $A_3$=0.00011016, $A_5$=−0.000509972, $A_7$=5.5789531E-07, $A_9$=−6.1761984E-07, $A_{10}$=−2.7607128E-10, $A_{12}$=−3.8446170E-09, $A_{14}$=2.6788063E-09, $A_{16}$=−4.7744225E-12, $A_{18}$=4.8865466E-12, $A_{20}$=−1.2584172E-11, $A_{21}$=−1.1562329E-14, $A_{23}$=2.1268750E-14, $A_{25}$=−4.3909505E-16, and $A_{27}$=3.6354825E-14.

4. The system as claimed in claim 1, wherein an x'y' polynomial surface equation is $$z'(x', y') = \frac{c'(x'^2 + y'^2)}{1 + \sqrt{1 - (1+k')c'^2(x'^2 + y'^2)}} + A_2' y' + A_3' x'^2 + A_5' y'^2 + A_7' x'^2 y' + A_9' y'^3 + A_{10}' x'^4 + A_{12}' x'^2 y'^2 + A_{14}' y'^4 + A_{16}' x'^4 y' + A_{18}' x'^2 y'^3 + A_{20}' y'^5 + A_{21}' y'^6 + A_{23}' x'^4 y'^2 + A_{25}' x'^2 y'^4 + A_{27}' y'^6,$$

wherein, c' represents surface curvature, k' represents conic constant, and $A_2' \sim A_{27}'$ represent coefficients.

5. The system as claimed in claim 4, wherein c'=0.003876139, k'=−0.34802184, $A_2'$=−0.199697292, $A_3'$=−0.003296752, $A_5'$=−0.006989087, $A_7'$=−1.9538487E-06, $A_9'$=−2.8779308E-05, $A_{10}'$=−9.4487860E-08, $A_{12}'$=−2.4621298E-07, $A_{14}'$=2.7636424E-07, $A_{16}'$=−7.4539496E-10, $A_{18}'$=−2.7376614E-09, $A_{20}'$=1.1386414E-08, $A_{21}'$=−9.1533262E-12, $A_{23}'$=−3.4125882E-11, $A_{25}'$=4.5002836E-12, and $A_{27}'$=2.5113825E-10.

6. The system as claimed in claim 1, wherein an x"y" polynomial surface equation is $$z''(x'', y'') = \frac{c''(x''^2 + y''^2)}{1 + \sqrt{1 - (1+k'')c''^2(x''^2 + y''^2)}} + A_2'' y'' + A_3'' x''^2 + A_5'' y''^2 + A_7'' x''^2 y'' + A_9'' y''^3 + A_{10}'' x''^4 + A_{12}'' x''^2 y''^2 + A_{14}'' y''^4 + A_{16}'' x''^4 y'' + A_{18}'' x''^2 y''^3 + A_{20}'' y''^5 + A_{21}'' y''^6 + A_{23}'' x''^4 y''^2 + A_{25}'' x''^2 y''^4 + A_{27}'' y''^6,$$

wherein, c" represents surface curvature, k" represents conic constant, and $A_2'' \sim A_{27}''$ represent coefficients.

7. The system as claimed in claim 6, wherein c"=0.002586059, k"=−19.29884842, $A_2''$=−0.084234843, $A_3''$=−0.004737493, $A_5''$=−0.004749666, $A_7''$=−1.2831834E-06, $A_9''$=−3 0.4279386E-06, $A_{10}''$=−1.9965925E-08, $A_{12}''$=−2.8581720E-08, $A_{14}''$=1.5682997E-07, $A_{16}''$=−3.1135397E-11, $A_{18}''$=−2.3756684E-10, $A_{20}''$=1.1136538E-09, $A_{21}''$=−4.3993354E-12, $A_{23}''$=−1.0892720E-11, $A_{25}''$=−5.9049331E-12, and $A_{27}''$=1.0527961E-11.

8. The system as claimed in claim 1, wherein a distance between the first origin and the second origin is about 139.873 mm.

9. The system as claimed in claim 1, wherein a distance between the second origin and the third origin is about 84.992 mm.

10. The system as claimed in claim 1, wherein a distance between the image sensor and a Y"X" plane is about 85.414 mm.

11. The system as claimed in claim 1, wherein an off-axial three-mirror optical system with freeform surfaces effective entrance pupil diameter is about 72 mm.

12. The system as claimed in claim 1, wherein an off-axial three-mirror optical system with freeform surfaces field angle is about 24°×0.07°.

13. The system as claimed in claim 12, wherein an angle along a X-axis direction is in a range from about −12° to about 12°.

14. The system as claimed in claim 12, wherein an angle along a Y-axis direction is in a range from about −9.965° to about −10.035°.

15. The system as claimed in claim 1, wherein an off-axial three-mirror optical system with freeform surfaces wavelength is in a range from about 350 nm to about 770 nm.

16. The system as claimed in claim 1, wherein an off-axial three-mirror optical system with freeform surfaces effective focal length is about 94.09 mm.

17. The system as claimed in claim 1, wherein an off-axial three-mirror optical system with freeform surfaces relative aperture is about 0.769.

18. The system as claimed in claim 1, wherein an off-axial three-mirror optical system with freeform surfaces F-number is about 1.3.

* * * * *